Oct. 26, 1943. R. C. OSGOOD Re. 22,386

MATERIAL LOADING APPARATUS

Original Filed April 30, 1938 4 Sheets-Sheet 1

Inventor:
Robert C. Osgood.
by Louis A. Maxon.
Atty.

Oct. 26, 1943. R. C. OSGOOD Re. 22,386

MATERIAL LOADING APPARATUS

Original Filed April 30, 1938 4 Sheets-Sheet 2

Inventor:
Robert C. Osgood.
by Louis A. Maxson.
Atty.

Oct. 26, 1943. R. C. OSGOOD Re. 22,386

MATERIAL LOADING APPARATUS

Original Filed April 30, 1938 4 Sheets-Sheet 3

Inventor:
Robert C. Osgood.
by Louis D. Maxson.
Atty.

Oct. 26, 1943. R. C. OSGOOD Re. 22,386

MATERIAL LOADING APPARATUS

Original Filed April 30, 1938 4 Sheets-Sheet 4

Inventor:
Robert C. Osgood.

by Louis A. Maxson
Atty.

Reissued Oct. 26, 1943

Re. 22,386

UNITED STATES PATENT OFFICE 22,386

MATERIAL LOADING APPARATUS

Robert C. Osgood, Claremont, N. H., assignor to Sullivan Machinery Company, a corporation of Massachusetts Original No. 2,201,672, dated May 21, 1940, Serial No. 205,168, April 30, 1938. Application for reissue November 7, 1941, Serial No. 418,254

20 Claims. (Cl. 214—131)

This is an application for reissue of Letters Patent No. 2,201,672, granted May 21, 1940.

This invention relates to material loading apparatus, and more particularly to improvements in a material loading apparatus of the type commonly known as a "muck loader" especially adapted to use in underground mining work for loading loose material from the mine floor into a suitable receptacle, such as a mine car.

An object of the present invention is to provide an improved material loading apparatus especially designed for use in underground mining work for loading loose material, and more particularly for use in metal mines for loading muck from the mine floor into a mine car. Another object is to provide an improved material loading apparatus of the type commonly known as a "muck loader" having improved means for supporting and guiding the shovel during its movement from its lowered digging position to its raised dumping position whereby a minimum amount of head room is required for the shovel movement. Still another object is to provide an improved shovel mounting for a loading apparatus of the pivoted shovel type. A further object is to provide an improved tilting rocker structure for supporting the shovel during its swinging movement and having improved means for controlling the path of shovel swing whereby a minimum amount of head room is required for shovel movement. A still further object of this invention is to provide an improved rocking supporting structure for the shovel whereby when the latter approaches its dumping position, the path of shovel swing is modified, so that the final swinging movement of the shovel is through a different arc; and as a result, the head room is not only maintained at a minimum, but also the amount of final downward swing of the shovel is substantially decreased. Still another object is to provide an improved shovel rocking structure for increasing the discharge height of the shovel whereby mine cars of substantially greater height may be employed in conjunction with the loading apparatus without increasing the head room necessary for the shovel to swing from its digging position to its dumping position. A still further object is to provide an improved shovel rocker structure employing semi-circular rocker elements and an improved guideway along which the rocker elements move during swinging of the shovel from its digging position to its dumping position, the guideway having an adjustable portion whereby the path of swinging movement of the shovel may be variably modified as the shovel approaches its dumping position to accommodate mine cars of different heights. A further object is to provide an improved adjustable connection of the shovel swinging chains with the segmental rocker frames whereby the swinging leverage and the rate of shovel swing may be varied to suit different conditions. Other objects and advantages of the invention will, however, hereinafter more fully appear in the course of the following description and as more particularly pointed out in the appended claims.

In the accompanying drawings there are shown for purposes of illustration one form and a modification thereof which the invention may assume in practice.

Figure 1:
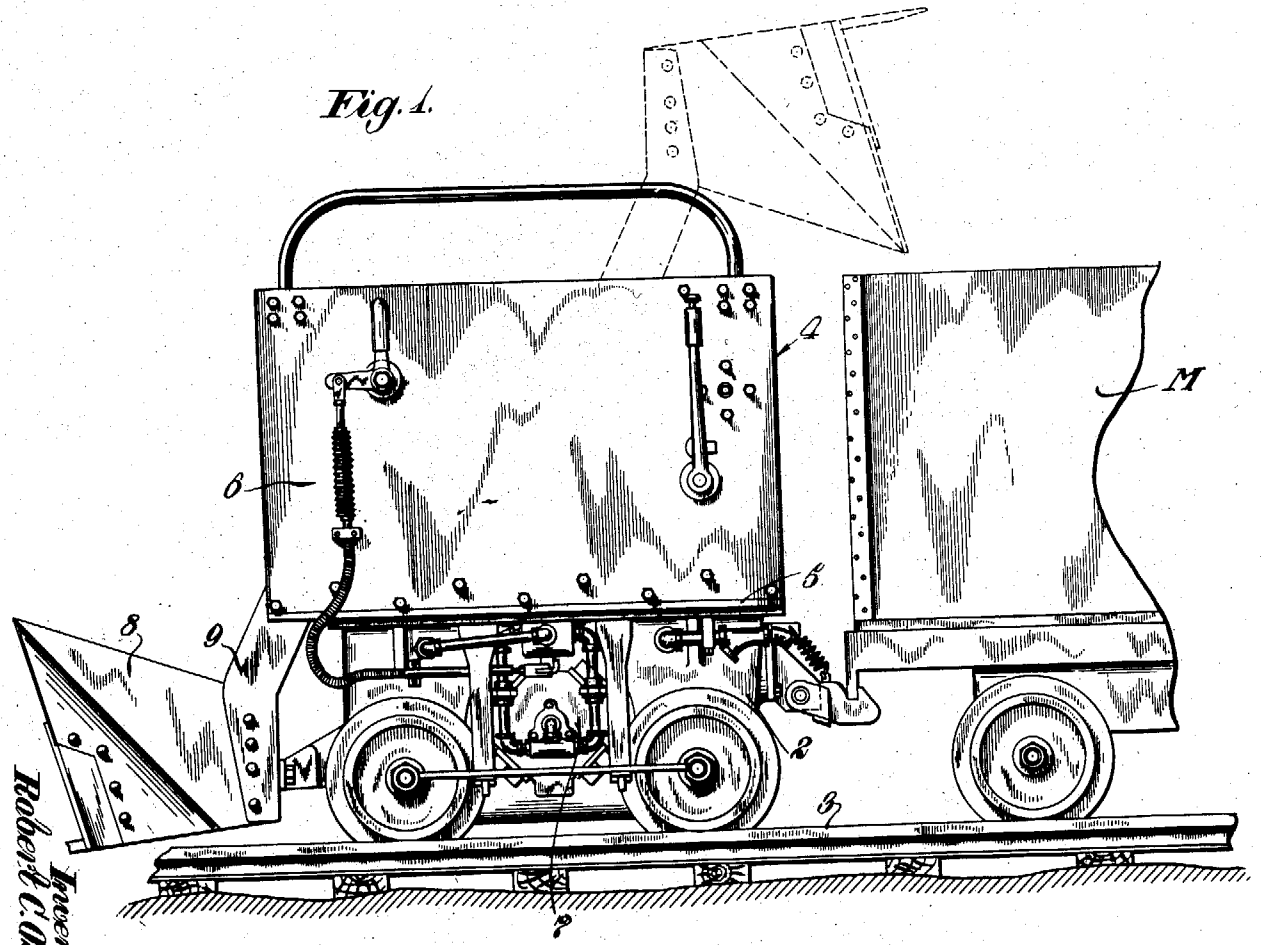
Fig. 1 is a side elevational view of a material loading apparatus in which an illustrative form of the invention is embodied, together with a mine car into which the apparatus discharges.

In one illustrative embodiment of the invention, the improved shovel-rocker supporting and guiding structure, generally designated 1, shown embodied in a material loading apparatus of the type commonly known as a "muck loader," and may be of the same general type as that disclosed in my copending application Serial No. 184,447, filed Jan. 11, 1938. It will be understood, however, that features of the invention may be embodied in material loading apparatus of various other types. The material loading apparatus, with which the improved shovel-rocker structure is associated, comprises a self-propelled base 2, herein a wheeled truck, adapted to travel along a trackway 3 laid on the mine floor. The wheeled truck 2 has swivelly mounted thereon, for horizontal swinging movement relative thereto, a superstructure, generally designated 4, on which the shovel is mounted. This superstructure comprises a swivel frame 5 having upstanding side walls 6 in the form of vertical side plates, and the frame 5 is swivelled in a vertical bearing mounting on the frame of the truck in the manner clearly described in the copending application mentioned above. The driving means for the truck wheels comprises a motor 7, of a conventional design, arranged on the truck beneath the superstructure and suitably operatively connected to the truck wheels so that the apparatus may be propelled in either of opposite directions along the mine trackway. The shovel is indicated at 8 and is supported by parallel side arms 9, 9 mounted on segmental frames or rockers 10 of semi-circular shape. These rockers are provided with arcuate bearing surfaces 11 supported by and adapted to roll along the supporting and guiding structure, as will later be explained. Lying along the inner sides of the rocker guideways are flexible cables 12, 12 each secured at one end at 13 to the swivel frame 5 and at their opposite ends by yieldable spring connections 14 to the segmental rocker frames 10, the cables passing around arcuate guiding grooves on the segmental rocker frames parallel with the arcuate supporting surfaces 11. The cables 15 of a second pair are secured at one end at 16 to a portion of the improved supporting and guiding structure, as will later be explained, and at their opposite ends by yieldable spring connections, similar to the connections 14, to the segmental rocker frames, these cables also lying in arcuate grooves on the segmental rocker frames. These pairs of cables 12 and 15 serve to retain the segmental rocker frames 10 against displacement from the supporting and guiding structure while at the same time compelling rocking movement of the segmental frames along their guideways to thus afford a shifting pivot for the shovel upon swinging of the shovel supporting arms. Obviously, instead of pairs of cables, a single cable may be employed for each segmental rocker frame with an intermediate loop secured to the segmental frame which, at that time, might be circular in shape.

For raising and lowering the shovel 8 on its shiftable pivotal mounting or rocker structure, means is provided comprising flexible side chains 17 adapted to be wound on flanged wheels or drums 18, one end of each chain being fastened to a drum, while the other ends of the chains are secured at 19 to the segmental rocker frames 10 at the ends of the latter nearer the side arms 9. The intermediate portions of the chains 17 pass around arcuate guiding surfaces on the segmental rocker frames parallel with the arcuate bearing surfaces 11, so that when the chains are wound in by the drums 18 the shovel is swung upwardly and rearwardly. A motor similar to the motor 7 is employed for rotating the shovel-raising drums 18, in the manner clearly described in the co-pending application mentioned above. The side chains 17, at their connection with the segmental rocker frames, may be adjustable to vary the swinging leverage and the rate of shovel swing, thereby to enable loading of mine cars of different lengths; and to accomplish this a series of points of connection 19 is provided on the rocker frames.

Figure 6:
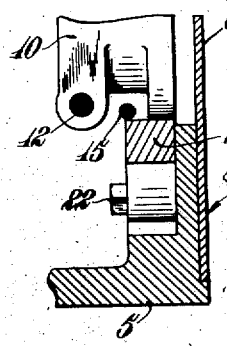
Fig. 6 is a cross sectional view taken on line 6—6 of Fig. 4.
Figure 8:
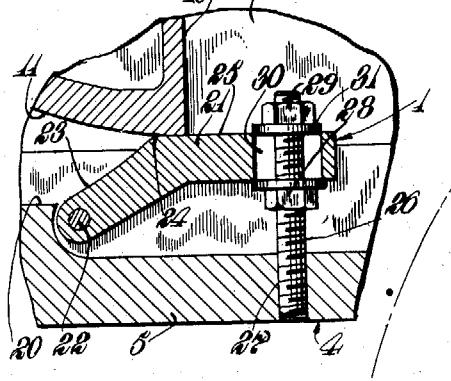
Fig. 8 is a detail sectional view taken substantially on line 8—8 of Fig. 5 and taken in a vertical plane parallel and in adjacency to the plane of the section shown in Fig. 4.

Now referring to the improved supporting and guiding structure for the segmental rocker frames 10, it will be noted that the arcuate bearing surfaces 11 on the rocker frames 10 are supported on and adapted to roll along parallel horizontal guideways 20 extending longitudinally of the shovel frame 5 at the inner sides of the upstanding side walls of the latter. The cables 12 and 15 above described lie along the inner sides of these guideways, in the manner shown in Fig. 6. The rearward portions of the guideways 20 are herein adjustable in a vertical direction and comprise vertically adjustable guide members 21 pivotally mounted at 22 on the shovel frame 5 and having upwardly inclined arcuate surfaces 23 forming continuations of the surfaces of the guideways 20, these arcuate surfaces being joined by oppositely curved surfaces 24 with rearwardly extending plane surfaces 25, the surfaces 24 and 25 likewise formed on the members 21. The means for adjusting the members 21 in a vertical direction about their pivots comprises, as shown, the studs 26 threaded at 27 within the frame 5 and having adjusting nuts 28 and lock nuts 29. The studs 26 extend through openings 30 (Fig. 8) in the members 21, and the nuts 29 engage washers 31 in turn engaging the upper surfaces of the members 21, while the nuts 28 engage similar washers in turn engaging the lower surfaces of the members 21. It will thus be seen that the members 21 may be adjusted in a vertical direction as desired, thereby to modify the contour of the guideways along which the segmental rocker frames are adapted to move. The connections 16 of the cables 15 with the supporting and guiding structure comprise upstanding lugs 32 integral with the members 21, and having suitable sockets for receiving the cable ends.

Figure 9:
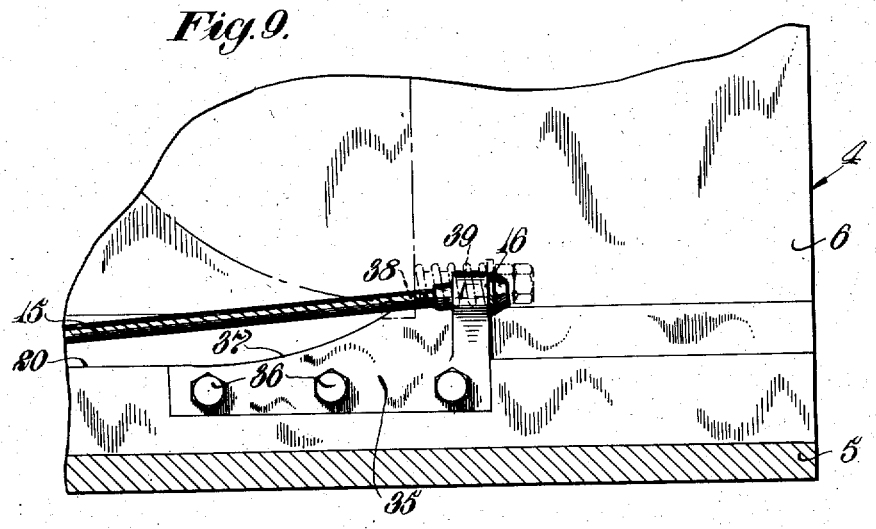
Fig. 9 is a detail sectional view similar to Fig. 3, showing a modified form of construction.
Figure 10:
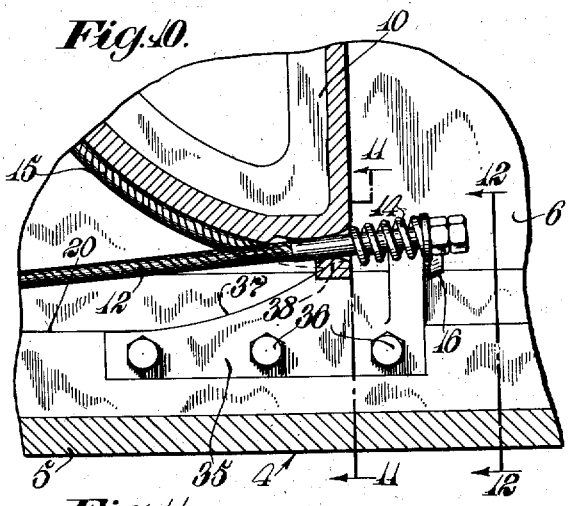
Fig. 10 is a detail vertical sectional view, similar to Fig. 4, illustrating details of the structure shown in Fig. 9.
Figure 12:
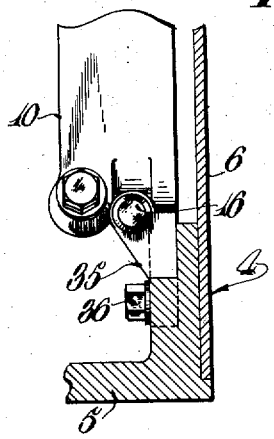
Fig. 12 is a cross sectional view taken on line 12—12 of Fig. 10.
Figure 11:
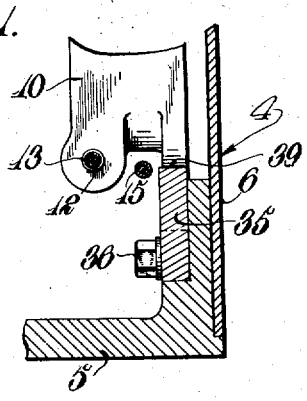
Fig. 11 is a cross sectional view taken on line 11—11 of Fig. 10.

In the modified form of the invention shown in Figs. 9 to 11, inclusive, the rearward upwardly inclined portions of the guideways 20 are non-adjustable and comprise guide blocks 35 attached by bolts 36 to the frame 5. These guide blocks 35 have upwardly inclined arcuate surfaces 37 forming a continuation of the surfaces of the guideways 20 and connected by oppositely curved surfaces 38 with rearwardly extending top plane surfaces 39. When it is desired to vary the path of movement of the shovel, blocks of different form may be substituted for those disclosed, in an obvious manner.

Figure 4:
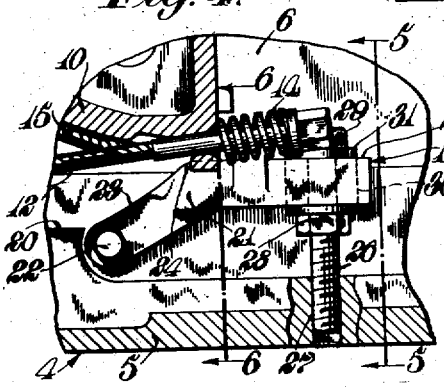
Fig. 4 is a view similar to Fig. 3, showing in section a portion of one of the rockers in shovel dumping position with respect to the supporting and guiding structure.
Figure 5:
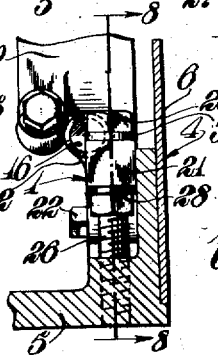
Fig. 5 is a cross sectional view taken on line 5—5 of Fig. 4.

It will thus be seen that in both forms of rocking guides the supporting and guiding structure for the segmental rocker frames has horizontal plane guiding surfaces extending through a substantial distance of the length thereof and upwardly inclined rearward surfaces, so that when the segmental rocker frames approach their rearmost positions on the supporting and guiding structure, they are lifted upward until the surfaces 11 on the rocker frames 10 rest on the top rearward plane surfaces; and as a result, the rocker frames are elevated during the final rolling movement thereof. Obviously, the shape and the height of the blocks 21 and 35 may be varied in accordance with the result desired. If the proportions shown in Figs. 4 and 8, for example, be used, a definite lift in the motion of the shovel may be noted. If the proportions of Figs. 9 and 10 be followed, there will be a smoother shift in pivot point, so to speak. By selecting a long flat arc, a short sharp lift, or an intermediate construction, different results may be secured. A primary objective will ordinarily be to elevate the ultimate point about which shovel swing takes place so that the downward movement thereof prior to dumping may be lessened, while at the same time the raising of the pivot point will be delayed, relative to the travel of the rocker frames, in such a manner as to hold down the highest points in the sweep of the shovel.

Figure 2:
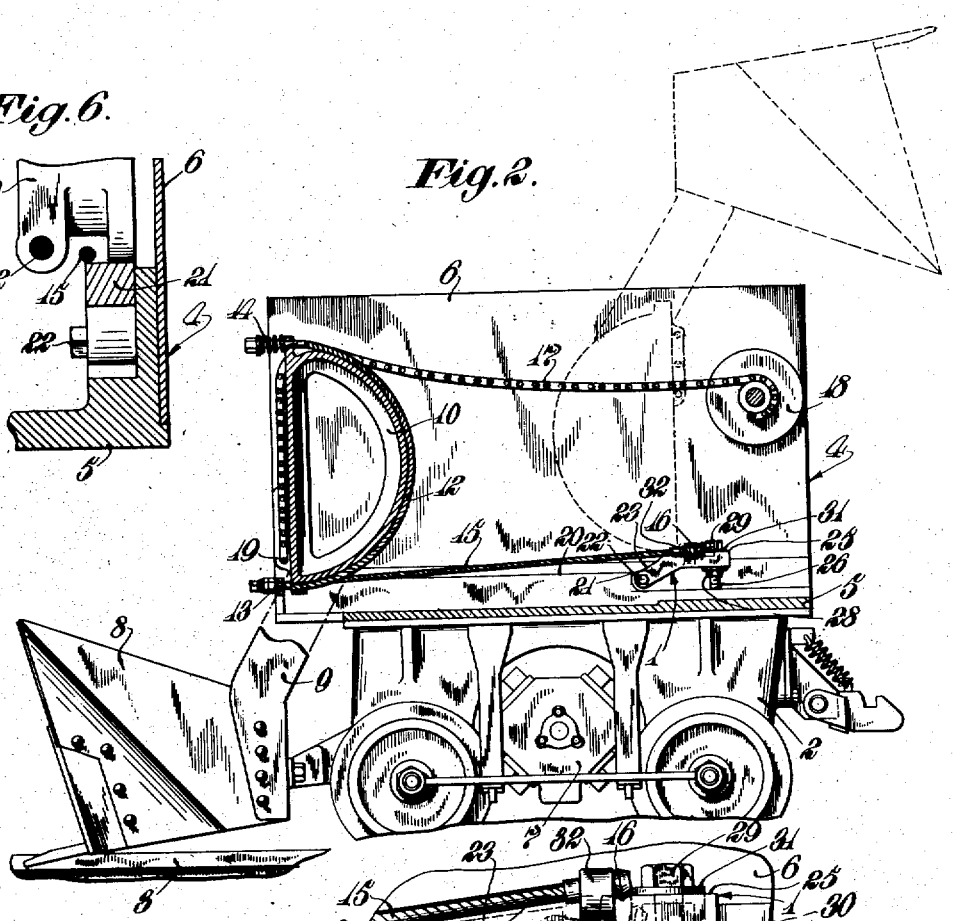
Fig. 2 is a view in longitudinal vertical section, with parts shown in elevation, taken through the loading apparatus shown in Fig. 1, parts being omitted to facilitate illustration.
Figure 3:
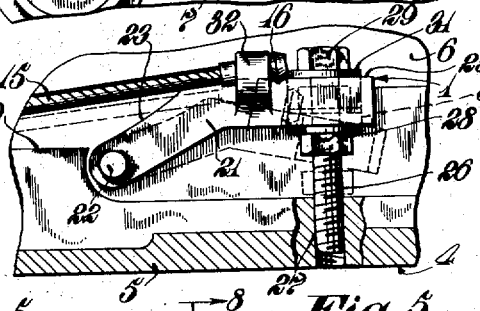
Fig. 3 is an enlarged detail vertical sectional view showing a portion of the improved shovel supporting and guiding structure.
Figure 7:
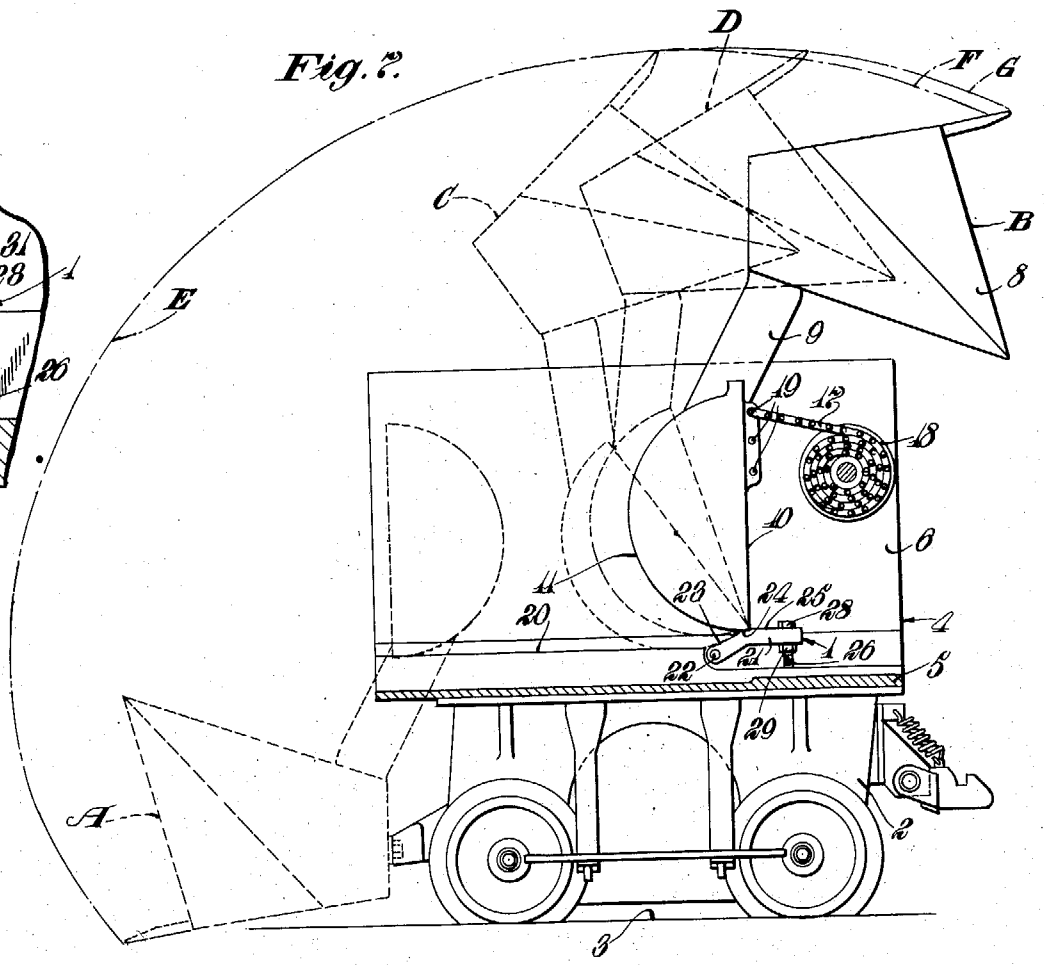
Fig. 7 is a somewhat diagrammatic view showing the various positions of the shovel during its movement from its digging position to its dumping position, the view taken in a vertical plane parallel to the plane of the section shown in Fig. 2.

The general mode of operation of the improved material loading apparatus will be clearly apparent from the description given. During the digging operation of the shovel 8, the latter is lowered by swinging the segmental rocker frames 10 into the position shown in Figs. 1 and 2 and the position indicated diagrammatically at A in Fig. 7, and when the shovel is in this position, the loading apparatus may be propelled forwardly along the mine trackway, under the propulsion of the truck wheels, to crowd the penetrating edge of the shovel into the pile of muck, and as the shovel crowds into the muck pile, it is simultaneously moved slightly up and down by the shovel raising drums 18 and chains 17 to facilitate the digging operation, in the manner clearly described in the copending application above referred to. When the shovel is loaded, it may be swung upwardly and rearwardly about its shifting pivotal mounting from its digging position into its raised dumping position, as indicated in dotted lines in Figs. 1 and 2 and diagrammatically in full lines at B in Fig. 7, likewise by means of the shovel raising drums and chains. The shovel, when in this latter position, is abruptly stopped by suitable buffer means, and the material contained therein is discharged into a mine car M (Fig. 1) coupled to the truck of the loading apparatus, also in a manner described in the copending application above referred to. When the shovel reaches the position indicated diagrammatically in dotted lines at C in Fig. 7, further rearward movement along a continuation of the plane surfaces 20 would cause increasing downward movements of the shovel. By the provision of my invention, however, there will be caused, as the shovel continues to swing, an engagement of points considerably further along upon the bottom arcuate surfaces 11 of the segmental rocker frames 10 with the upper extremities of the upwardly curved surfaces 23 on the members 21, thereby causing the shovel to be relatively elevated as it approaches its dumping position, as indicated in dotted lines at D in Fig. 7. When the shovel reaches its dumping position, as indicated at B in Fig. 7, the curved bearing surfaces 11 of the rocker frames have rolled so far that the surfaces 11 rest on the rearward top plane surfaces 25, as shown most clearly in Fig. 8. It is accordingly evident that the shovel, during the portion of its upward stroke as it approaches its dumping position, moves through a different arc from that which would correspond to a continuation of the other portion of its upward swinging stroke. When the segmental rocker frames 10, as described in the copending application above mentioned, were moved along the plane horizontal guiding surfaces, the shovel moved through an arcuate path as indicated diagrammatically in dot and dash lines at E in Fig. 7; and when the shovel approached its dumping position, it moved through a downwardly inclined path as indicated at F in Fig. 7. By the provision of the blocks or guide elements 21 and 35, the shovel, as it approaches its dumping position, moves through a modified arc, as indicated at G in Fig. 7, so that when the shovel is in its dumping position, the lowermost point on the shovel is located in a substantially higher position than it was previous to the provision of the members 21. This improved structure not only maintains the head room necessary for shovel movement substantially at a minimum, but also reduces the amount of final downward movement of the shovel, thereby enabling the use of mine cars of substantially greater height. The mode of operation of the modification shown in Figs. 9 to 11, inclusive, is similar to that shown in Figs. 1 to 7 inclusive, with the exception that when it is desired to vary the final upward movement of the shovel with the latter apparatus, the members 21 may be adjusted by adjusting the screws 26, while the guide blocks of Figs. 9 to 11 may be interchanged with guide blocks of a different size. Otherwise, this modified form of the invention operates in substantially the same manner as that above described.

As the segmental rocker frames 10 move onto the elevated surfaces of the rocker guideways, the cables 12 and 15 are deflected and yield at their spring connections sufficiently to permit such movement of the rocker frame. The cables act, however, at all times to hold the rocker frames in position on the guideways and prevent any substantial slippage between the rocker frame bearing surfaces and the guideway surfaces.

It will be evident that by the provision of the adjustable guide portions or interchangeable guide blocks of the rocker guide structure, the amount which the shovel is elevated as it approaches its raised dumping position may be readily varied, thereby to enable the loading apparatus to load into mine cars of varying height, without increasing the head room necessary for shovel swing. It will further be evident that by elevating the rockers as the shovel approaches its dumping position, the arc of shovel swing is modified so that the shovel moves through a substantially higher arc at that time; and as a result, the path of shovel movement is so to speak, leveled off to a substantial extent as the shovel moves toward its dumping position. By elevating the shovel as it approaches its dumping position, it is possible to load into mine cars of greater height than heretofore without increasing the head room necessary for shovel swing or the amount of rearward movement of the shovel. Further, by the provision of the series of connections 19 of the shovel swinging chains 17 with the rocker frames, the swinging leverage and the rate of shovel swing may be varied, so that the shovel may move toward its dumping position at different velocities, and due to the throwing action of the shovel on the material, the latter may be discharged rearwardly at different distances. This enables loading of mine cars of different length, in an obvious manner.

While there are in this application specifically described one form and a modification thereof which the invention may assume in practice, it will be understood that this form and modification of the same are shown for purposes of illustration and that the invention may be further modified and embodied in various other forms without departing from its spirit or the scope of the appended claims.

What I claim as new and desire to secure by Letters Patent is:

1. In a material loading apparatus, in combination, a material-receiving member, a rolling frame structure for supporting said material-receiving member for arcuate movement in a vertical direction from its lowered material-receiving position to its raised material-discharging position, and a supporting and guiding structure for said rolling frame structure comprising means providing a guideway over which said rolling frame structure passes as said material-receiving member moves arcuately as aforesaid, said guideway having a forward horizontal guiding portion and an elevated rearward guiding portion, said rolling frame structure as it passes from said horizontal portion onto said elevated portion moving upwardly, thereby to elevate said material-receiving member as it approaches its material-discharging position.

2. In a material loading apparatus, in combination, a material receiving member, a rolling frame structure for supporting said material-receiving member for arcuate movement in a vertical direction from its lowered material-receiving position to its raised material-discharging position comprising a rolling frame having a curved bearing surface, and a supporting and guiding structure for said rolling frame structure comprising means providing a guideway over which said rolling frame passes as said material-receiving member moves arcuately as aforesaid, said guideway having a forward horizontal guiding portion and an elevated rearward guiding portion, said rolling frame as it passes from said horizontal portion onto said elevated portion moving upwardly, thereby to elevate said material-receiving member as it approaches its material-discharging position.

3. In a material loading apparatus, in combination, a shovel, a rocking frame structure for supporting said shovel for swinging movement in a vertical direction from its lowered digging position to its raised dumping position, and a supporting and guiding structure for said rocking frame structure comprising means providing a guideway over which said rocking frame structure passes as said shovel is swung as aforesaid, said guideway having a forward horizontal guiding portion and a raised rearward guiding portion, said rocking frame structure as it passes from said horizontal portion onto said raised portion moving upwardly, thereby to elevate said shovel as it approaches its dumping position.

4. In a material loading apparatus, in combination, a shovel, a rocking frame structure for supporting said shovel for swinging movement in a vertical direction from its lowered digging position to its raised dumping position comprising a semi-circular rocker frame, and a supporting and guiding structure for said rocking frame structure comprising means providing a guideway over which said rocker frame passes as said shovel is swung as aforesaid, said guideway having a forward horizontal guiding portion and a raised rearward guiding portion, said rocker frame as it passes from said horizontal portion onto said raised portion moving upwardly, thereby to elevate said shovel as it approaches its dumping position.

5. In a material loading apparatus, in combination, a shovel, a rocking frame structure for supporting said shovel for swinging movement in a vertical direction from its lowered digging position to its raised dumping position comprising a semi-circular rocker frame, and a supporting and guiding structure for said rocking frame structure comprising means providing a guideway over which said rocker frame passes as said shovel is swung as aforesaid, said guideway having a rearward portion elevated with respect to its forward portion, and said rocker frame as it moves from said forward portion onto said elevated portion altering its previous path along said guideway and moving upwardly, thereby to elevate said shovel as it approaches its dumping position.

6. In a material loading apparatus, in combination, a material loading member, a rocking frame structure for supporting said loading member for swinging movement in a vertical direction from its lowered material-receiving position into its raised material-discharging position comprising a pair of semi-circular rocker frames, and a supporting and guiding structure for said rocker frames comprising frame members providing horizontal guideways having elevated rearward portions, said rocker frames, upon swinging of said rocking frame structure, moving over said horizontal guideways onto said elevated rearward portions and said elevated rearward portions, as said rocker frames move thereon, causing said rocker frames to move upwardly thereby to elevate said material loading member as it approaches its material-discharging position.

7. In a material loading apparatus, in combination, a shovel, a rocking frame structure for supporting said shovel for swinging movement in a vertical direction from its lowered digging position to its raised dumping position comprising a pair of semi-circular rocker frames, and a supporting and guiding structure for said rocker frames comprising frame members providing horizontal guiding surfaces and cooperating members having upwardly inclined surfaces, said rocker frames adapted to move over said surfaces and said members causing said rocker frames to move upwardly thereby to elevate the shovel as it approaches its dumping position, said cooperating members being mounted for adjustment in a vertical direction whereby the elevation of the shovel may be varied, and means for adjusting said members.

8. In a material loading apparatus, in combination, a shovel, a rocking frame structure for supporting said shovel for swinging movement in a vertical direction from its lowered digging position to its raised dumping position comprising a semi-circular rocker frame, and a supporting and guiding structure for said rocking frame structure comprising a frame member providing a horizontal guiding surface and a cooperating member having a guiding surface elevated with respect to said horizontal surface, said rocker frame moving first along the horizontal guiding surface of said frame member and then onto the guiding surface of said cooperating member as said shovel is swung as aforesaid, and said rocker frame as it passes from said horizontal surface onto said elevated surface moving upwardly, thereby to elevate said shovel as it approaches its dumping position.

9. In a material loading apparatus, in combination, a shovel, a rocking frame structure for supporting said shovel for swinging movement from its lowered digging position to its raised dumping position comprising a semi-circular rocker frame, and a supporting and guiding structure for said rocking frame structure comprising a frame member providing a horizontal guiding surface and a cooperating member having a guiding surface elevated with respect to said horizontal surface and an inclined surface extending between said horizontal surface and said elevated surface, said rocker frame moving over said guiding surfaces as said shovel is swung as aforesaid, said rocker frame as it moves from said horizontal surface along along said inclined surface onto said elevated surface moving upwardly, thereby to elevate said shovel as it approaches its dumping position.

10. In a material loading apparatus, in combination, a shovel, a rocking frame structure for supporting said shovel for swinging movement in a vertical direction from its lowered digging position to its raised dumping position comprising a semi-circular rocker frame, and a supporting and guiding structure for said rocking frame structure comprising a frame member providing a horizontal forward guiding surface and a cooperating member arranged at the rear end of said frame member and having a guiding surface elevated with respect to said horizontal surface, said rocker frame moving along said surfaces as said shovel is swung as aforesaid, and said rocker frame as it moves from said horizontal surface onto said elevated surface moving upwardly, thereby to elevate said shovel as it approaches its dumping position.

11. In a material loading apparatus, in combination, a shovel, a rocking frame structure for supporting said shovel for swinging movement from its loading position to its dumping position comprising a semi-circular rocker frame having a moving fulcrum point, and guiding means along which said frame travels during shovel swing including a plane guideway and, near the rearward extremity of the latter, means above the plane which includes said plane guideway for effecting an elevation of the moving fulcrum point about which the shovel swings as said point moves rearwardly.

12. In a material loading apparatus, in combination, a shovel, a pivotal mounting structure for said shovel, and means having connection with said mounting structure for swinging said shovel from its lowered digging position to its raised dumping position, said connection of said swinging means with said mounting structure including means whereby the point of said connection with said mounting structure may be changed thereby to vary the swinging leverage and the rate of shovel swing.

13. In a material loading apparatus, in combination, a shovel, a rocking frame structure for supporting said shovel for swinging movement in a vertical direction from its lowered digging position to its raised dumping position comprising a semi-circular rocker frame, a supporting and guiding structure for said rocking frame structure comprising means providing a guideway over which said rocker frame passes as said shovel is swung as aforesaid, said guideway having a rearward portion elevated with respect to its forward portion, and said rocker frame as it moves from said forward portion onto said elevated portion moving upwardly, thereby to elevate said shovel as it approaches its dumping position, and means for adjusting the elevated position of said rearward portion of said guideway to vary the elevated position of said shovel as it approaches its dumping position.

14. In a material loading apparatus, the combination comprising a shovel, a pivoted frame structure for supporting said shovel for swinging movement from its loading position to its dumping position and vice versa, said swingable frame structure having a moving point of rolling support, and supporting and guiding means for said swingable frame structure providing horizontal guiding means along which said rolling support point is guided for movement during swinging of said frame structure as aforesaid, said guiding means having near its rearward extremity means for effecting elevation of said rolling support point thereby to elevate the shovel as the latter approaches its dumping position.

15. In material loading apparatus, the combination comprising a material-receiving member, a swingable frame structure for supporting said material-receiving member for swinging movement in a vertical direction from its lowered material-receiving position to its raised material-discharging position and vice versa, said swingable frame structure having a moving fulcrum point, and a supporting and guiding structure for said swingable frame structure comprising means providing a guideway along which the fulcrum point of said swingable frame structure is guided for movement as said material-receiving member swings vertically as aforesaid, said guideway having a forward horizontal guiding portion and an elevated rearward guiding portion, said swingable frame structure as said fulcrum point thereof moves rearwardly from said horizontal guiding portion onto said elevated guiding portion moving upwardly thereby to elevate said material-receiving member as it approaches its material-discharging position.

16. In a material loading apparatus, the combination comprising a base, a shovel, a frame structure for supporting said shovel for swinging movement from a relatively low loading position over said base to a dumping position, means for supporting said frame structure during such swinging movement including a guideway extending generally horizontally longitudinally of said base and means on said frame structure cooperating with said guideway, means cooperating with said frame structure to compel swinging movement thereof as said frame structure moves longitudinally relative to said guideway, and means for moving said frame structure longitudinally of said guideway to cause the movement of said frame structure and the coaction with the latter of said swinging movement compelling means to effect movement of said shovel from loading to dumping position, said guideway having near its rearward end means for effecting elevation of said means on said frame structure which cooperates with the guideway thereby to elevate the shovel as the latter approaches dumping position.

17. In a material loading apparatus, the combination comprising a support, a shovel, a pivoted frame structure for supporting said shovel for swinging movement from its lowered digging position to its raised dumping position and vice versa, said frame structure having a moving point of support, connections between said frame structure and said support for compelling swinging movement of said frame structure as said moving point of support moves longitudinally of said support, means providing a guideway on said support extending longitudinally of said support and having a forward portion supporting the moving point of support for said pivoted frame structure when said shovel is in digging position and a rearward portion, higher than said forward portion, supporting said moving point of support when said shovel is in dumping position, and an intermediate portion lying below a straight line connecting said forward and rearward portions, and means for causing said moving point of support to traverse said guideway.

18. In a material loading apparatus, the combination comprising a shovel, a frame swingable in a vertical direction and by which said shovel is carried for swinging the latter from its lowered digging position to its raised dumping position and vice versa, and supporting, guiding and constraining means for said swingable shovel carrying frame for causing said shovel to travel initially and until its maximum elevation is reached along one curve and subsequently along a curve which is higher than a continuation of said first mentioned curve beyond the point of separation of said curves until dumping is effected, said supporting, guiding and constraining means including ways having horizontal forward portions and upwardly inclined rearward portions.

19. In a material loading apparatus, the combination comprising a shovel, a frame swingable in a vertical direction and by which said shovel is carried for swinging the latter from its lowered digging position to its raised dumping position and vice versa, and supporting and guiding means for said swingable shovel carrying frame providing a horizontal guiding means along which said frame is supported for guided movement as said frame swings as aforesaid, and means arranged near the rear end of said horizontal guiding means for effecting elevation of said swingable frame with respect to said horizontal guiding means thereby to elevate the shovel as the latter approaches its raised dumping position.

20. In a material loading apparatus, the combination comprising a shovel, a frame swingable in a vertical direction and by which said shovel is carried for swinging the latter from its lowered digging position to its raised dumping position and vice versa, and supporting and guiding means for said swingable shovel carrying frame providing a horizontal guiding means along which said frame is supported for guided movement as said frame swings as aforesaid, and means arranged near the rear end of said horizontal guiding means for effecting elevation of said swingable frame with respect to said horizontal guiding means thereby to elevate the shovel as the latter approaches its raised dumping position, said elevation effecting means including a supporting means for said shovel carrying frame having a supporting surface disposed at an elevation above said horizontal guiding means so positioned that said swingable frame moves downwardly from said elevation effecting means onto said horizontal guiding means as said frame swings forwardly during movement of said shovel from its dumping position toward its lowered digging position.

ROBERT C. OSGOOD.